United States Patent
Nishinaga et al.

(10) Patent No.: US 7,346,367 B2
(45) Date of Patent: Mar. 18, 2008

(54) ELECTRONIC APPARATUS HAVING COMMUNICATING FUNCTION AND PRIVACY MODE

(75) Inventors: Kyoko Nishinaga, Kawasaki (JP); Ken Hayashida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 11/235,356

(22) Filed: Sep. 27, 2005

(65) Prior Publication Data
US 2006/0015894 A1 Jan. 19, 2006

Related U.S. Application Data

(63) Continuation of application No. PCT/JP03/04777, filed on Apr. 15, 2003.

(51) Int. Cl.
*H04M 1/00* (2006.01)
(52) U.S. Cl. .......... 455/550.1; 455/566; 455/90.1; 379/93.17
(58) Field of Classification Search ............ 455/550.1, 455/566, 575.1, 575.3, 575.4, 90.1, 90.3; 379/428.01, 428.03, 433.07, 93.17; 725/25, 725/28, 30
See application file for complete search history.

(56) References Cited

U.S. PATENT DOCUMENTS

2005/0119031 A1* 6/2005 Spalink et al. .............. 455/566
2005/0191988 A1* 9/2005 Thornton et al. ........ 455/404.1
2005/0268240 A1* 12/2005 Kankaanpaa ................ 715/747
2006/0172779 A1* 8/2006 Yoshida ....................... 455/567
2006/0246956 A1* 11/2006 Park et al. ................... 455/566

FOREIGN PATENT DOCUMENTS

| JP | 61-281657 | 12/1986 |
| JP | 63-318851 | 12/1988 |
| JP | 9-153946 | 6/1997 |
| JP | 11219244 A * | 8/1999 |
| JP | 2002-33819 | 1/2002 |
| JP | 2002-281129 | 9/2002 |

OTHER PUBLICATIONS

MANUAL For mova F504ls, Nov. 2002, 7 pages.

* cited by examiner

*Primary Examiner*—Matthew D. Anderson
*Assistant Examiner*—Sujatha Sharma
(74) *Attorney, Agent, or Firm*—Staas & Halsey LLP

(57) ABSTRACT

An electronic apparatus has a communicating function and a privacy mode that prohibits access to and display of data and/or folders with respect to which a secret setting has been made. A storage part stores first contents, and second contents of the data and/or the folders with respect to which the secret setting has been made. A display part displays a standby screen, a call/receive screen or an electronic mail send/receive screen. A control part switches contents of a screen to be displayed by displaying the first contents in place of the second contents during the privacy mode, if the second contents are set in the standby screen, the call/receive screen or the electronic mail send/receive screen.

10 Claims, 12 Drawing Sheets

FIG.5
PIN input is required.
What is your PIN?
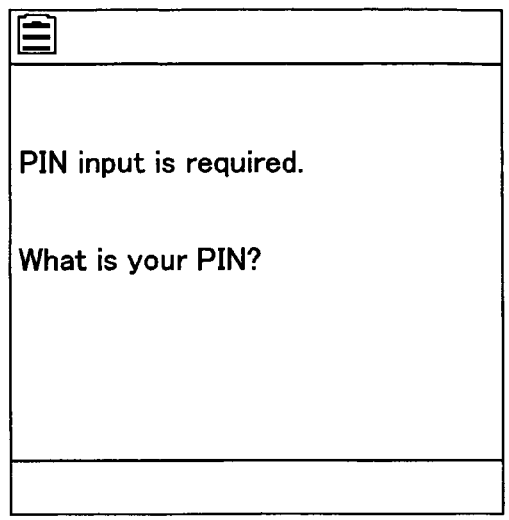
FIG.6
| Telephone Directory & Log | Without Lock |
| Mail | All |
| Schedule & To Do | No Setting |
| My Picture | Secret Setting |
| My Movie | Secret Setting |
| Screen Memo | All |
| Bookmark | No Setting |
FIG.7
Display of Telephone Directory & Log
Lock
Do Not Lock
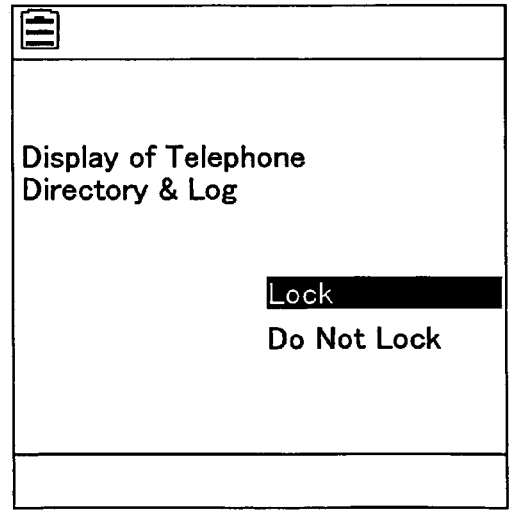

ELECTRONIC APPARATUS HAVING COMMUNICATING FUNCTION AND PRIVACY MODE

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2003/004777 filed Apr. 15, 2003, in the Japanese Patent Office, the disclosure of which is hereby incorporated by reference.

BACKGROUND OF THE INVENTION

1. Field of the Invention

The present invention generally relates to electronic apparatuses, and more particularly to an electronic apparatus which has a display function and a communicating function, such as a portable telephone, and is capable of setting image data a user wishes to keep secret, for a standby screen, a call/receive screen and an electronic mail (e-mail) send/receive screen.

In this specification, an "electronic apparatus" refers to an apparatus having a display function and a communicating function, such as portable telephones and portable computers. The "electronic apparatus" is not limited to a portable type apparatus.

2. Description of the Related Art

Some portable telephones may be set to the so-called privacy mode. When the privacy mode of the portable telephone is turned ON and the user makes a secret setting in advance with respect to folders of telephone directories, e-mails, images and the like the user wishes to keep secret, it is possible to prevent these folders from being accessed or displayed by a third person when the user forgets the portable telephone at some location or the user lends the portable telephone to someone else. For example, when the secret setting is made with respect to a predetermined image folder in the case where the privacy mode of the portable telephone is turned ON, this predetermined image folder becomes the so-called secret folder. Unless the privacy mode is turned OFF (or invalidated) by inputting the user's personal identification number or the like to the portable telephone, for example, it is impossible to make access to this secret folder and display the image within this secret folder.

On the other hand, some recent portable telephones are provided with a function that enables the user to set image data selected by the user, in addition to default image data, for the standby screen, the call/receive screen and the e-mail send/receive screen.

However, if the secret folder were set for the standby screen of the portable telephone, for example, there was be a problem in that it would not be possible to turn the privacy mode ON, in order to avoid the standby screen from being prevented from being displayed. In addition, in the state where the privacy mode of the portable telephone is turned ON, the access to the secret folder is prohibited, and for this reason, there was a problem in that the secret folder cannot be set for the standby screen. In other words, in the conventional portable telephones, there was a problem in that the secret data or folder cannot be set for the standby screen, the call/receive screen and the e-mail send/receive screen, regardless of whether the privacy mode is turned ON or OFF.

For example, the privacy mode and the secret folder are described in a catalog issued November 2002 for a portable telephone F504iS (video portable telephone having a maximum recording time of 30 minutes) manufactured by Fujitsu Limited of Japan.

SUMMARY OF THE INVENTION

Accordingly, it is a general object of the present invention to provide a novel and useful electronic apparatus in which the problems described above are suppressed.

Another and more specific object of the present invention is to provide an electronic apparatus that enables the secret data or folder to be set for the standby screen, the call/receive screen and the e-mail send/receive screen, regardless of whether the privacy mode is turned ON or OFF, and positively prevents display of the secret data or folder that is set for the screen when the privacy mode is turned ON.

Still another object of the present invention is to provide an electronic apparatus having a communicating function and a privacy mode that prohibits access to and display of data and/or folders with respect to which a secret setting has been made, comprising a storage part configured to store first contents, and second contents of the data and/or the folders with respect to which the secret setting has been made; a display part configured to display a standby screen, a call/receive screen or an electronic mail send/receive screen; and a control part configured to switch contents of a screen to be displayed on the display part by displaying the first contents in place of the second contents during the privacy mode, if the second contents of the data and/or the folders with respect to which the secret setting has been made are set in the standby screen, the call/receive screen or the electronic mail send/receive screen, wherein the first contents and the second contents are mutually different data, and the first contents are other than blank data. According to the electronic apparatus of the present invention, it is possible to enable the secret data or folder to be set for the standby screen, the call/receive screen and the e-mail send/receive screen, regardless of whether the privacy mode is turned ON or OFF, and positively prevent display of the secret data or folder that is set for the screen when the privacy mode is turned ON.

Other objects and further features of the present invention will be apparent from the following detailed description when read in conjunction with the accompanying drawings.

BRIEF DESCRIPTION OF THE DRAWINGS

FIG. 5 is a diagram showing a personal identification number input screen;

FIG. 6 is a diagram showing a secret setting screen;

FIG. 7 is a diagram showing a secret setting screen with respect to telephone directories and log data;

DESCRIPTION OF THE PREFERRED EMBODIMENTS

Figure 1:
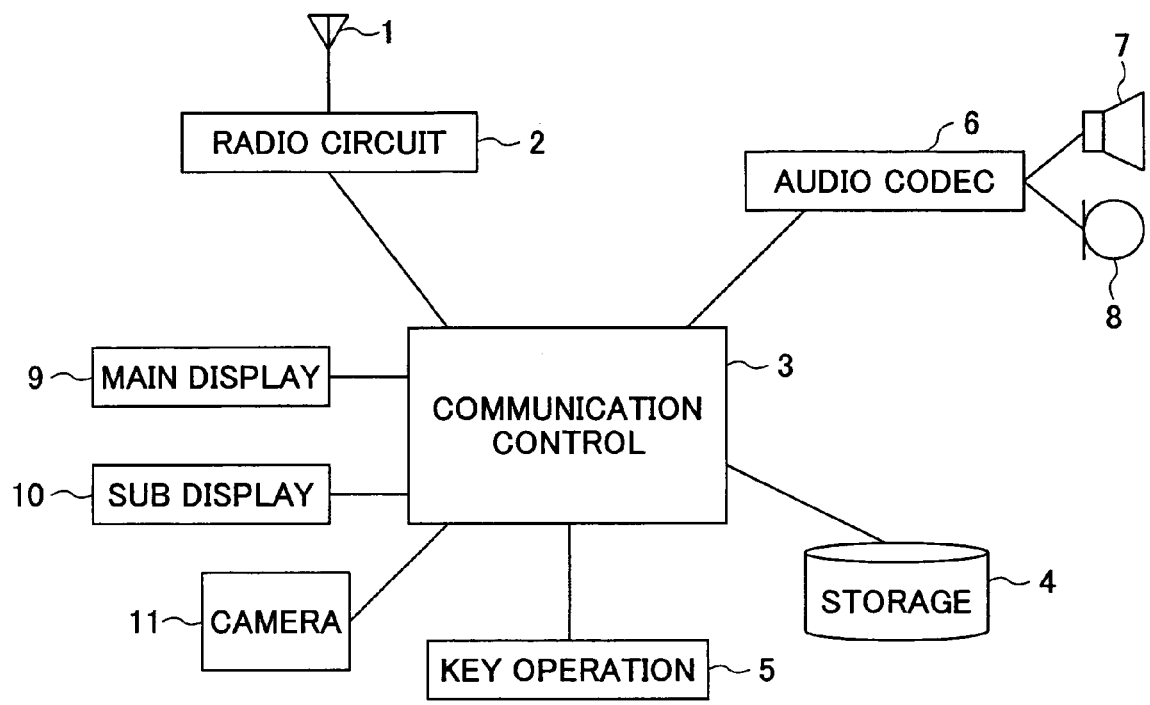
FIG. 1 is a system block diagram showing an embodiment of an electronic apparatus according to the present invention.

A description will be given of embodiments of an electronic apparatus according to the present invention, by referring to the drawings.

FIG. 1 is a system block diagram showing an embodiment of the electronic apparatus according to the present invention. In this embodiment, the present invention is applied to a portable telephone.

The portable telephone shown in FIG. 1 includes an antenna 1, a radio circuit part 2, a communication control part 3, a storage part 4, a key operation part 5, an audio codec 6, a speaker 7, a microphone 8, a main display part 9, a sub display part 10 and a camera 11. The radio circuit part 2, the storage part 4, the key operation part 5, the audio codec 6, the main display part 9, the sub display part 10 and the camera 11 may of course be connected to the communication control part 3 via one or a plurality of buses.

Figure 2:
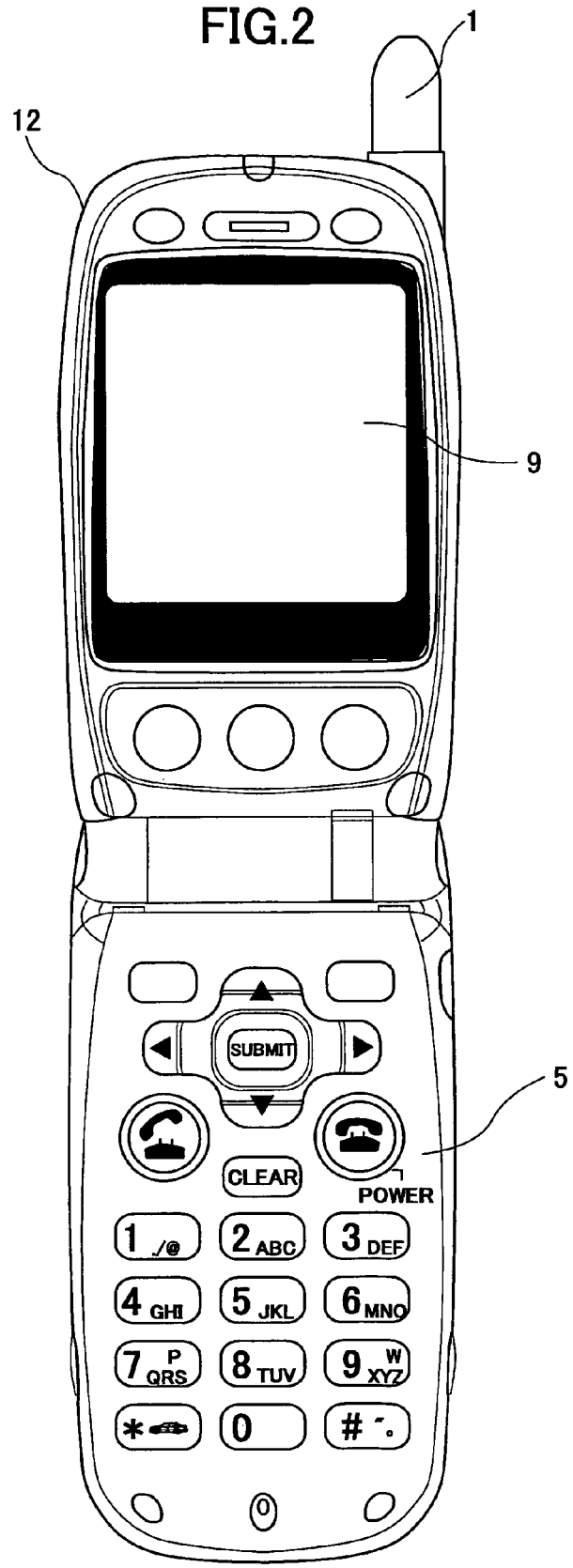
FIG. 2 is a diagram showing the embodiment of the electronic apparatus in a state where a lid is open.
Figure 3:
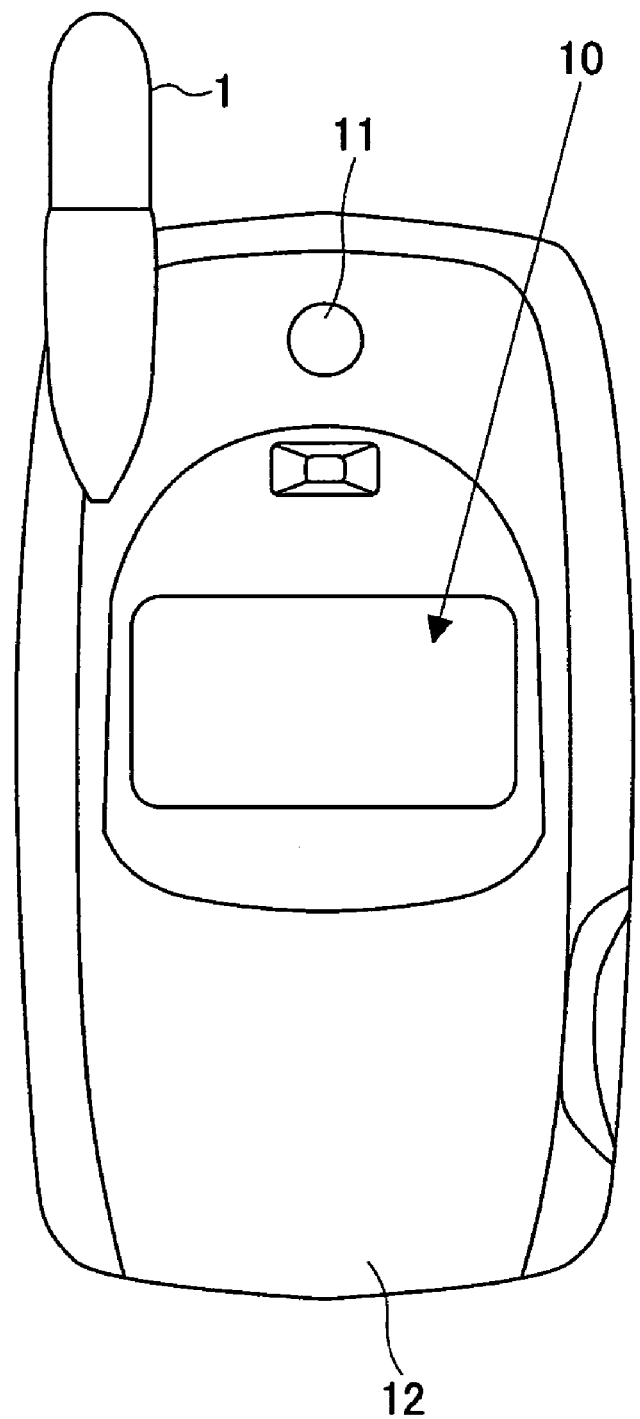
FIG. 3 is a diagram showing the embodiment of the electronic apparatus in a state where the lid is closed.

FIG. 2 is a diagram showing the electronic apparatus, that is, the portable telephone shown in FIG. 1 in a state where a lid 12 is open. FIG. 3 is a diagram showing the portable telephone shown in FIG. 1 in a state where the lid 12 is closed. In the state where the lid 12 is open, the user can confirm a display on the main display part 9 while operating the key operation part 5. In the state where the lid 12 is closed, the user can confirm a display on the sub display part 10.

The antenna 1 is used to transmit and receive radio waves when the portable telephone communicates with a radio base station (not shown). The radio circuit part 2 generates received data (modulated signals) by demodulating the radio waves received by the antenna 1, and outputs modulated signals via the antenna 1 by modulating transmitting data to a predetermined frequency.

The communication control part 3 includes a processor, such as a CPU, and carries out control operations so as to decode the demodulated signals generated in the radio circuit part 2, and to output encoded transmitting data to the radio circuit part 2 for making the communication.

The storage part 4 includes a flash memory, a Static Random Access Memory (SRAM) or the like, and stores various programs including application programs that are executed by the processor forming the communication control part 3, telephone number data, sent and received e-mail data, received image data, image data picked up by the camera 11, and the like. In addition, the storage part 4 also stores image data such as menus to be displayed on the main display part 9 and the sub display part 10, standby screens, call/receive screens and e-mail send/receive screens, telephone numbers, character data, and audio data such as various warning sounds to be output from the speaker 7, ringing sounds and/or melodies and messages. The audio data stored in the storage part 4 also includes transmitted and received audio data, audio data input by the user from the microphone 8, and default audio data related to ringing sounds and the like that are preset. Furthermore, the image data stored in the storage part 4 may be still image data or, dynamic image data or, both still image data and dynamic image data.

The key operation part 5 includes a ten-key, function keys and the like, and is operated when inputting telephone numbers, characters and the like and when making an operation on the menu. The key operation part 5 may have a structure including a dial (rotary dial) for making inputs, a touch panel and the like.

The audio codec 6 encodes the audio data decoded by the communication control part 3 according to specifications of an audio encoding scheme, and then converts the encoded audio data into an analog audio signal that is output to the speaker 7. In addition, the audio codec 6 converts an audio signal input from the microphone 8 into a digital signal, and then encodes the digital signal according to the specifications of the audio encoding scheme and outputs the encoded signal to the communication control part 3 as audio data. It is assumed for the sake of convenience that the speaker 7 includes an amplifier, and outputs the audio signal from the audio codec 6 as voice and/or sound. It is assumed for the sake of convenience tat the microphone 8 includes an amplifier, and outputs the audio signal to the audio codec 6 by inputting the voice of the user (caller).

The main display part 9 includes a Liquid Crystal Display (LCD), an Electro-Luminescence (EL) display or the like, and displays image data such as menus, standby screens, call/receive screens and e-mail send/receive screens, telephone numbers and character data. The sub display part 10 includes an LCD, an EL display or the like, and displays image data such as menus, standby screens, call/receive screens and e-mail send/receive screens, telephone numbers and character data, similarly to the case of the main display part 9. In this embodiment, both the main display part 9 and the sub display part 10 make full color displays.

The camera 11 inputs image data of the image picked up thereby to the communication control part 3. The structure of the camera 11 itself is known.

In this embodiment, it is assumed for the sake of convenience that a privacy mode can be set by the operation of the key operation part 5, similarly to existing portable telephones. When the privacy mode of the portable telephone is turned ON (or validated), that is, the mode of the portable telephone is the privacy mode, and the user makes a secret setting in advance with respect to folders the user wishes to keep secret, it is possible to prevent these folders from being accessed or displayed by a third person when the user forgets the portable telephone at some location or the user lends the portable telephone to someone else. For example, when the secret setting is made with respect to a predetermined image folder in the case where the privacy mode of the portable telephone is turned ON, this predetermined image folder becomes the so-called secret folder. Unless the privacy mode is turned OFF (or invalidated) and the portable telephone is set to a mode other than the privacy mode by inputting the user's personal identification number or the like to the portable telephone, for example, it is impossible to make access to this secret folder and display the image within this secret folder. Even if the privacy mode is turned ON, the folders with respect to which no secret setting is made can be accessed and displayed. In addition, when the privacy mode is turned OFF, all data and folders can be accessed and displayed regardless of whether the secret setting has been made.

On the other hand, some recent portable telephones are provided with a function that enables the user to set image data selected by the user, in addition to default image data, for the standby screen, the call/receive screen and the e-mail send/receive screen.

In this embodiment, it is assumed for the sake of convenience that the data and folders with respect to which the secret setting can be made in the privacy mode, include image data and image folders, bookmark data and bookmark folders, schedule data, To Do data, application data and application folders, e-mail data and e-mail folders, telephone directories, log data and the like. Furthermore, in this embodiment, it is assumed for the sake of convenience that if the secret setting is made with respect to the telephone directories and the log data, the portable telephone is put into a locked state where the telephone directories and the log data are prohibited from being accessed and displayed regardless of whether the privacy mode is turned ON or OFF.

Figure 4:
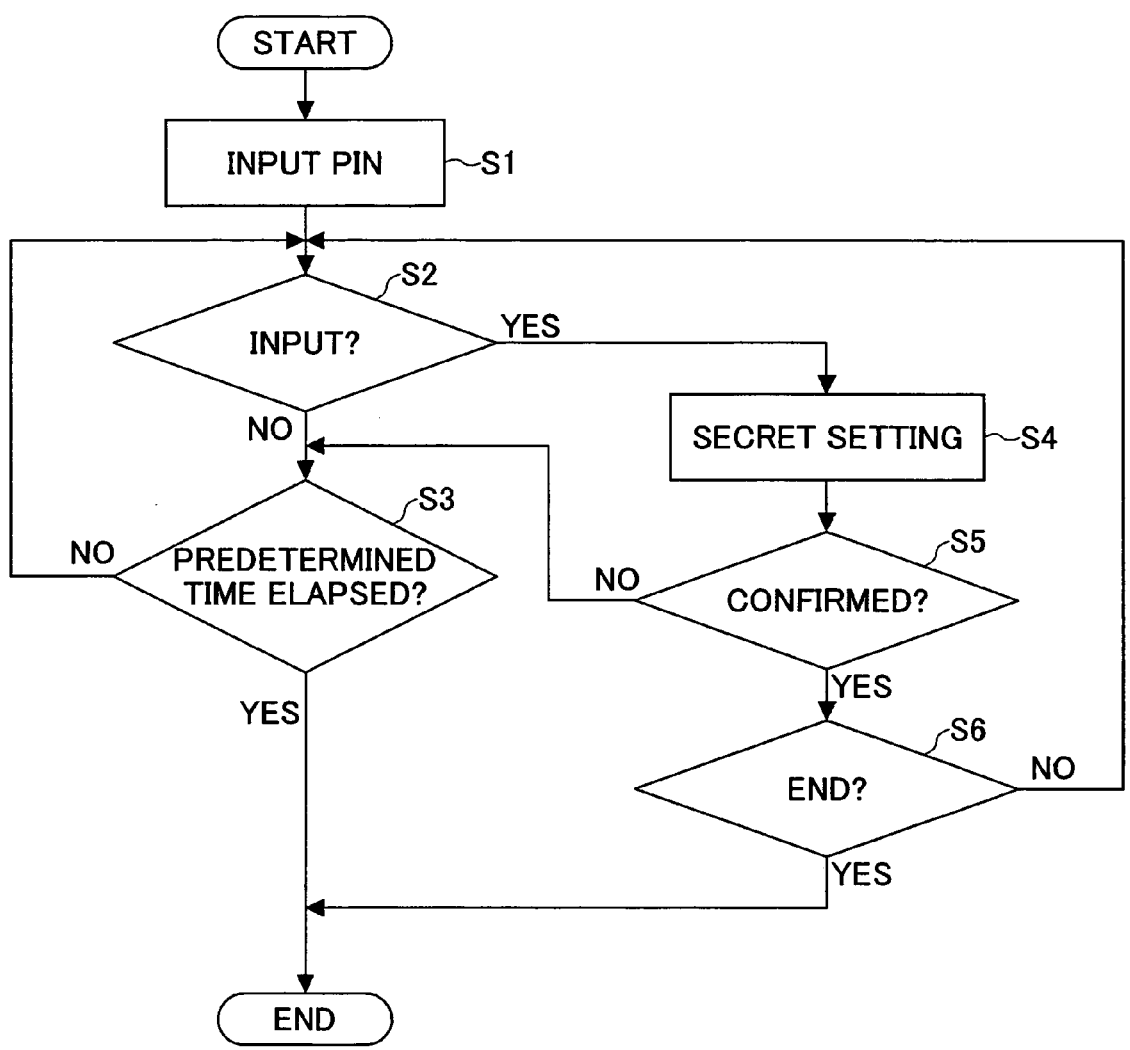
FIG. 4 is a flow chart for explaining a secret setting process.

FIG. 4 is a flow chart for explaining a secret setting process. The process shown in FIG. 4 is carried out by the processor forming the communication control part 3 shown in FIG. 1 based on inputs made from the key operation part 5.

The secret setting processing shown in FIG. 4 is started when the secret setting process of the privacy mode is instructed by the operation of the key operation part 5. In FIG. 4, a step S1 displays a Personal Identification Number (PIN) input screen shown in FIG. 5 on the main display part 9, and urges the user to input the user's PIN. FIG. 5 is a diagram showing the PIN input screen. A step S2 decides whether or not the PIN has been input by the operation of the key operation part 5, and the process advances to a step S3 if the decision result in the step S2 is NO. The step S3 decides whether or not a predetermined time has elapsed from a time when the PIN input screen is displayed, and the secret setting process ends if the decision result in the step S3 is YES. On the other hand, the process returns to the step S2 if the decision result in the step S3 is NO.

If the decision result in the step S2 is YES, a step S4 makes a secret setting depending on the operation of the key operation part 5. FIG. 6 is a diagram showing a secret setting screen. In FIG. 6, items for which the secret setting may be made include "Telephone Directory & Log" corresponding to the telephone directories and the log data described above, "Mail" corresponding to the e-mails described above, "Schedule & To Do" corresponding to the schedule data and the To Do data described above, "My Picture" corresponding to the still image data described above, "My Movie" corresponding to the dynamic image data described above, "Screen Memo" corresponding to the image data or the like picked up by the camera 11 described above, and "Bookmark" corresponding to the bookmark data described above.

A "With Lock" state or a "Without Lock" state can be set with respect to the "Telephone Directory & Log". FIG. 7 is a diagram showing the secret setting screen with respect to the telephone directories and the log data.

Figure 8:
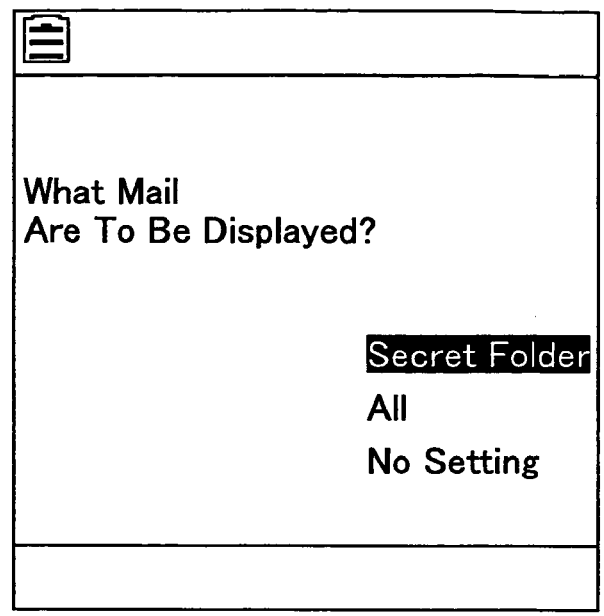
FIG. 8 is a diagram showing a secret setting screen with respect to electronic mails.

A "Secret Folder" state which specifies specific e-mails and makes the secret setting, an "All" state which makes the secret setting with respect to all e-mails, and a "No Setting" state which does not make the secret setting with respect to all e-mails can be set with respect to the "Mail". FIG. 8 is a diagram showing the secret setting screen with respect to the e-mails.

Figure 9:
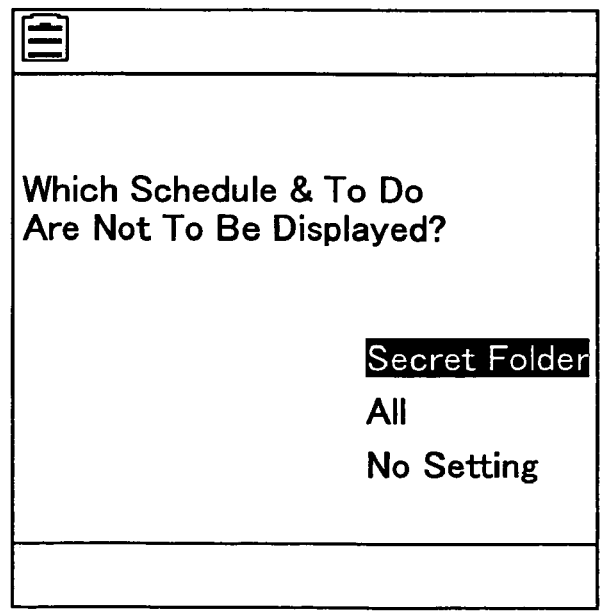
FIG. 9 is a diagram showing a secret setting screen with respect to schedule data and To Do data.

A "Secret Data" state which specifies specific schedule data or To Do data and makes the secret setting, an "All" state which makes the secret setting with respect to all schedule data or To Do data, and a "No Setting" state which does not make the secret setting with respect to all schedule data or To Do data can be set with respect to the "Schedule & To Do". FIG. 9 is a diagram showing the secret setting screen with respect to the schedule data and the To Do data.

A "Secret Data/Folder" state which specifies specific image folders or image data and makes the secret setting, an "All" state which makes the secret setting with respect to all image folders or image data, and a "No Setting" state which does not make the secret setting with respect to all image folders or image data can be set with respect to each of the "My Picture", "My Movie" and "Image Memo". The secret setting screens with respect to the image data are similar to those shown in FIGS. 8 and 9, and a description and illustration thereof will be omitted.

In FIG. 4, a step S5 decides whether or not the secret setting that is made in the step S4 is confirmed by the operation of the key operation part 5. The process returns to the step S3 if the decision result in the step S5 is NO. On the other hand, if the decision result in the step S5 is YES, a step S6 decides whether or not the secret setting has been ended by the operation of the key operation part 5. The process returns to the step S2 if the decision result in the step S6 is NO. If the decision result in the step S6 is YES, the secret setting process ends.

Figure 10:
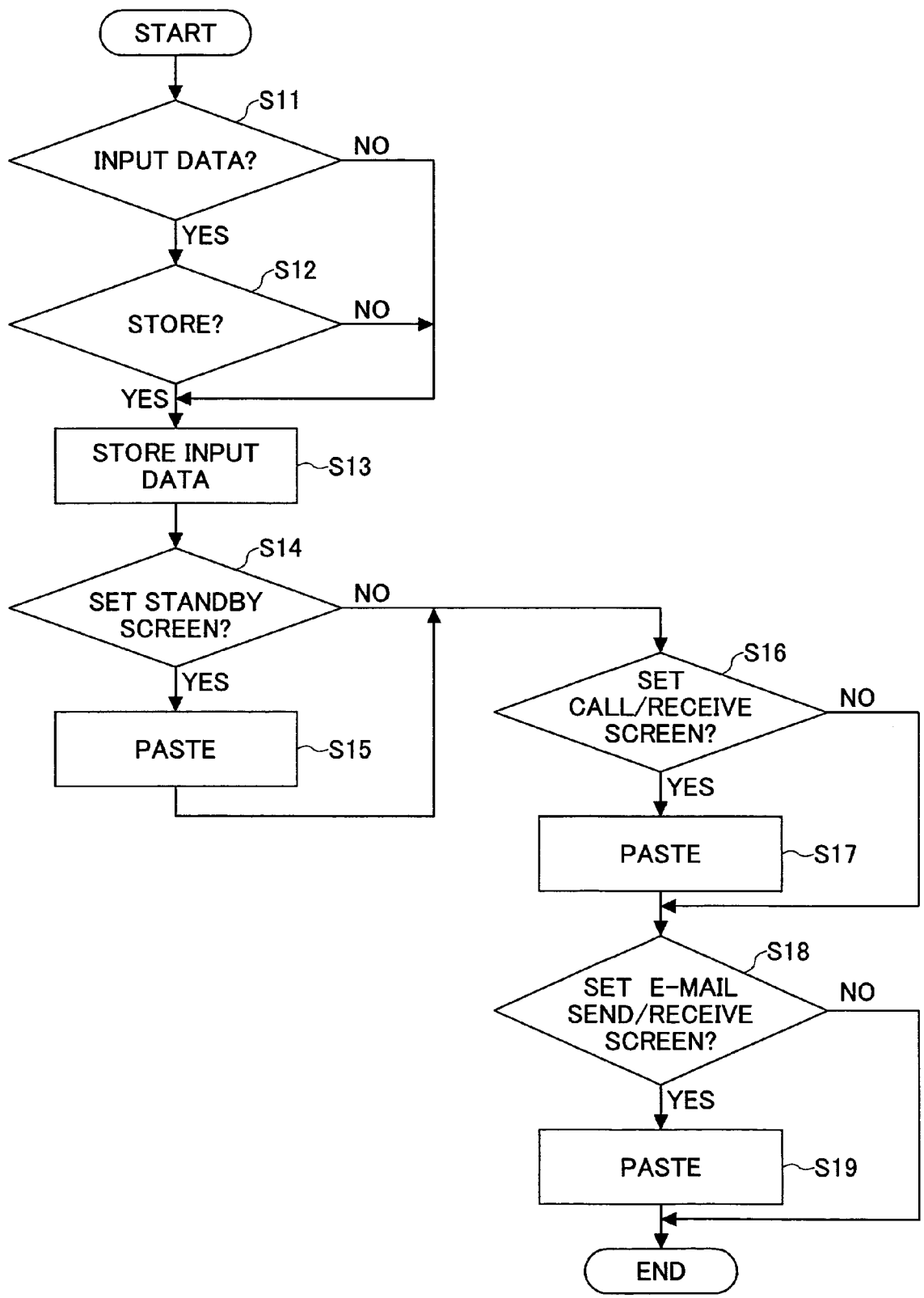
FIG. 10 is a flow chart for explaining a screen setting process.

FIG. 10 is a flow chart for explaining a screen setting process. The process shown in FIG. 10 is carried out by the processor forming the communication control part 3 shown in FIG. 1 based on inputs made from the key operation part 5.

The screen setting process shown in FIG. 10 is started when the screen setting process is instructed by the operation of the key operation part 5. In FIG. 10, a step S11 decides whether or not the input data includes image data and/or character data and/or audio data. The input data may be received from outside the portable telephone or, input from the microphone 8 or, input from the camera 11. The input data received from outside the portable telephone include image data and/or character data and/or audio data. The input data input from the microphone 8 include audio data, and the input data input from the camera 11 include image data. The process advances to a step S12 if the decision result in the step S11 is YES, and the process advances to a step S14 if the decision result in the step S11 is NO.

The step S12 decides whether or not storing of the input data is instructed by the operation of the key operation part 5. The process advances to a step S13 if the decision result in the step S12 is NO, and the process advances to the step S14 if the decision result in the step S12 is YES.

Figure 11:
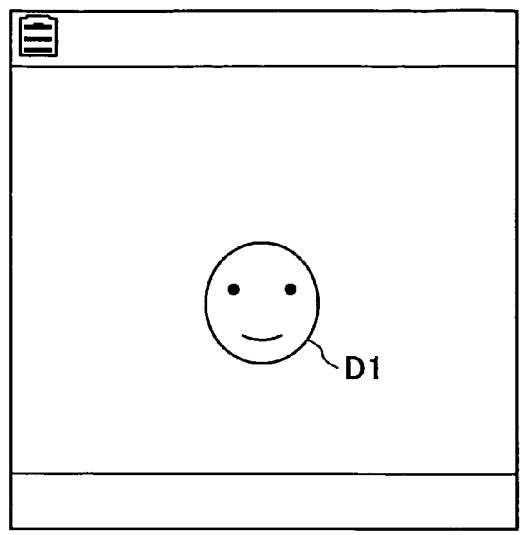
FIG. 11 is a diagram showing image data stored in a storage part.

The step S13 stores the input data in the storage part 4. FIG. 11 is a diagram showing image data D1 stored in the storage part 4. For example, the image data D1 is input from the camera 11.

Figure 12:
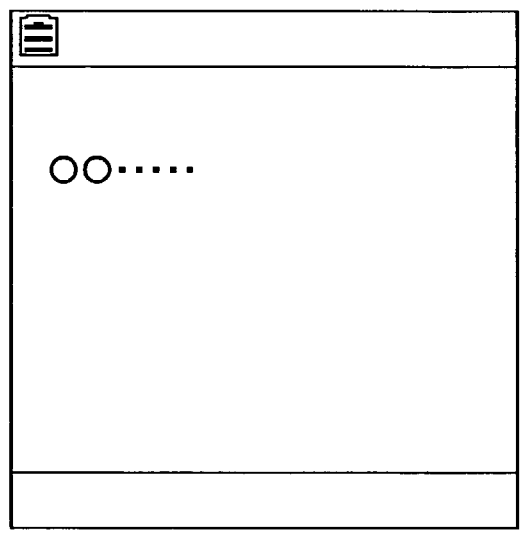
FIG. 12 is a diagram showing a standby screen.
Figure 13:
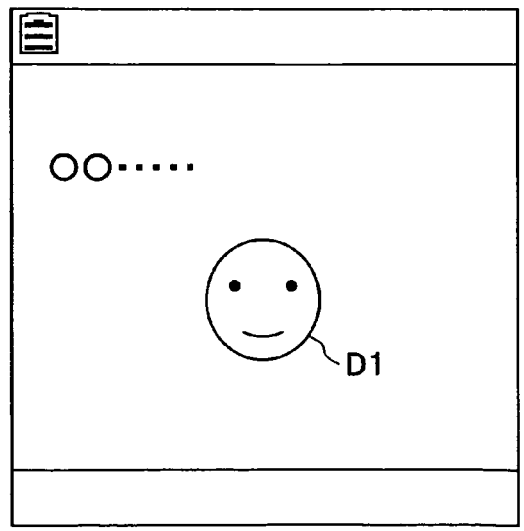
FIG. 13 is a diagram showing a set standby screen.

The step S14 decides whether or not a setting of a standby screen is instructed by the operation of the key operation part 5. The process advances to a step S15 if the decision result in the step S14 is YES, and the process advances to a step S16 if the decision result in the step S14 is NO. FIG. 12 is a diagram showing the standby screen. The step S15 pastes the image data D1 stored in the storage part 4 in the step S13 or, default image data D2 prestored in the storage part 4, to the standby screen, depending on the operation of the key operation part 5. As a result, a standby screen shown in FIG. 13 is set when the image data D1 is pasted onto the standby screen. FIG. 13 is a diagram showing the set standby screen.

Figure 14:
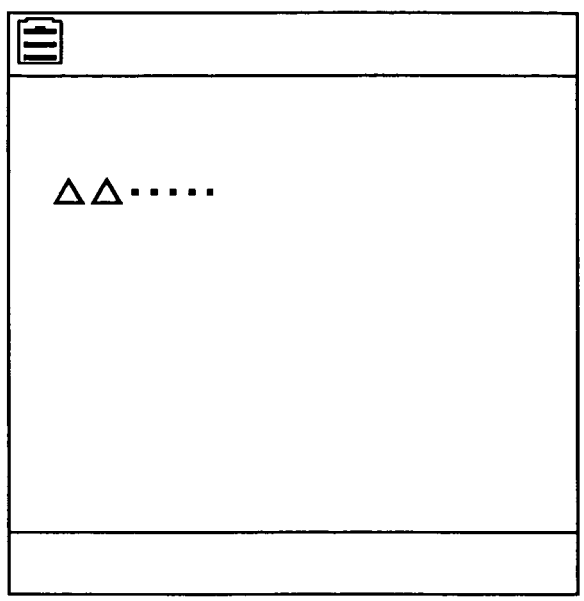
FIG. 14 is a diagram showing a call/receive screen.
Figure 15:
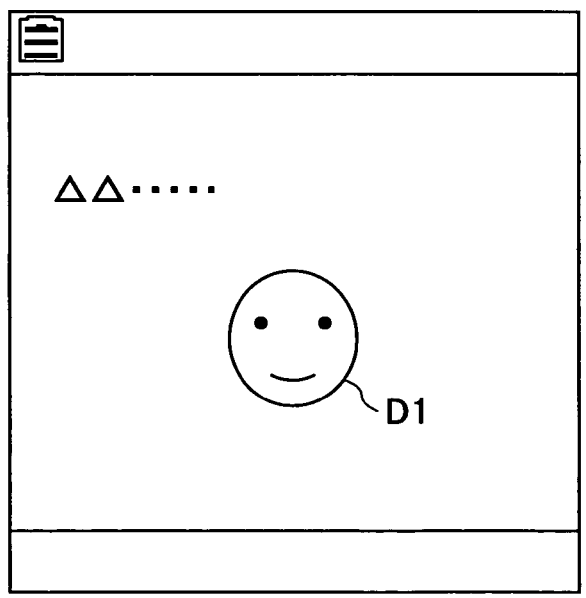
FIG. 15 is a diagram showing a set call/receive screen.

The step S16 decides whether or not a setting of a call/receive screen is instructed by the operation of the key operation part 5. The process advances to a step S17 if the decision result in the step S16 is YES, and the process advances to a step S18 if the decision result in the step S16 is NO. FIG. 14 is a diagram showing a call/receive screen. The step S17 pastes the image data D1 stored in the storage part 4 in the step S13 or, the default image data D2 prestored in the storage part 4, to the call/receive screen, depending on the operation of the key operation part 5. As a result, a call/receive screen shown in FIG. 15 is set when the image data D1 is pasted onto the call/receive screen. FIG. 15 is a diagram showing the set call/receive screen.

Figure 16:
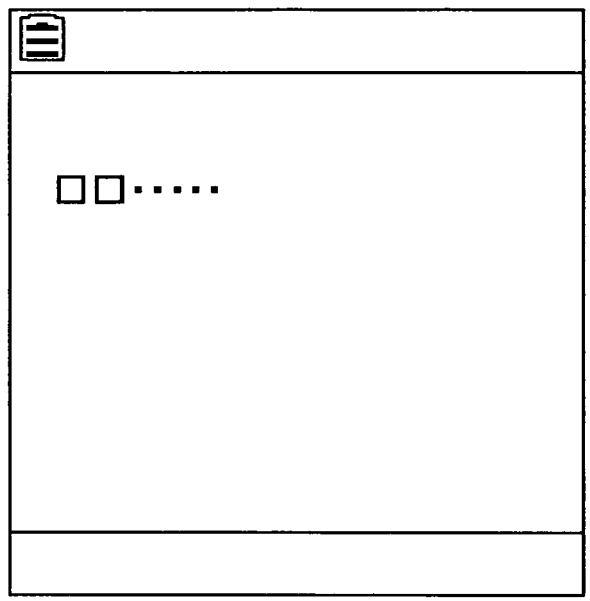
FIG. 16 is a diagram showing an e-mail send/receive screen.
Figure 17:
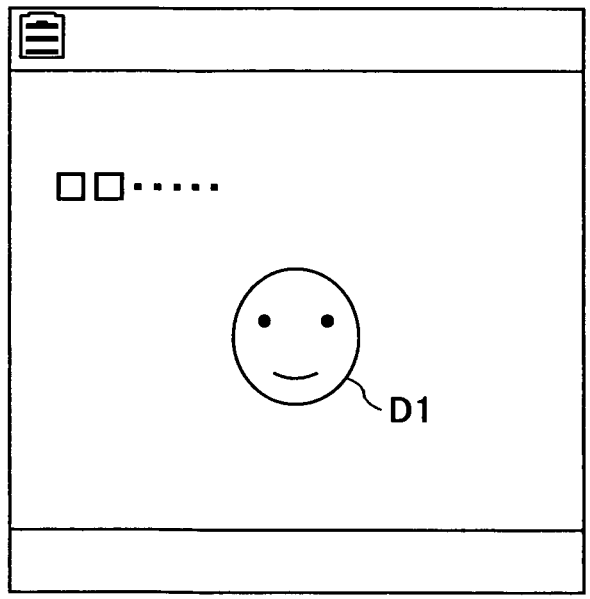
FIG. 17 is a diagram showing a set e-mail send/receive screen.

The step S18 decides whether or not a setting of an e-mail send/receive screen is set by the operation of the key operation part 5. The process advances to a step S19 if the decision result in the step S18 is YES, and the process ends if the decision result in the step S18 is NO. FIG. 16 is a diagram showing an e-mail send/receive screen. The step S19 pastes the image data D1 stored in the storage part 4 in the step S13 or, the default image data D2 prestored in the storage part 4, to the e-mail send/receive screen, depending on the operation of the key operation part 5. As a result, an e-mail send/receive screen shown in FIG. 17 is set when the image data D1 is pasted onto the e-mail send/receive screen. FIG. 17 is a diagram showing the set e-mail send/receive screen.

Figure 18:
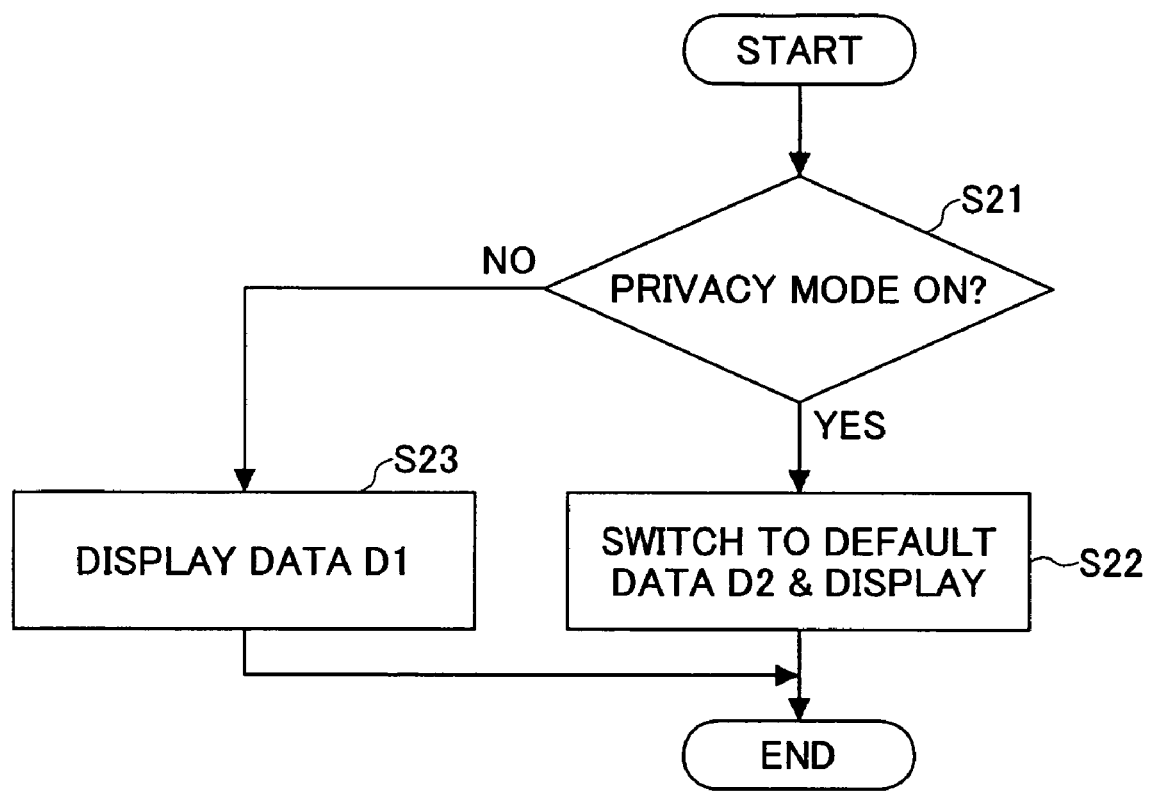
FIG. 18 is a flow chart for explaining a screen display process.

FIG. 18 is a flow chart for explaining a screen display process. The process shown in FIG. 18 is carried out by the processor forming the communication control part 3 shown in FIG. 1 based on inputs made from the key operation part 5.

Figure 19:
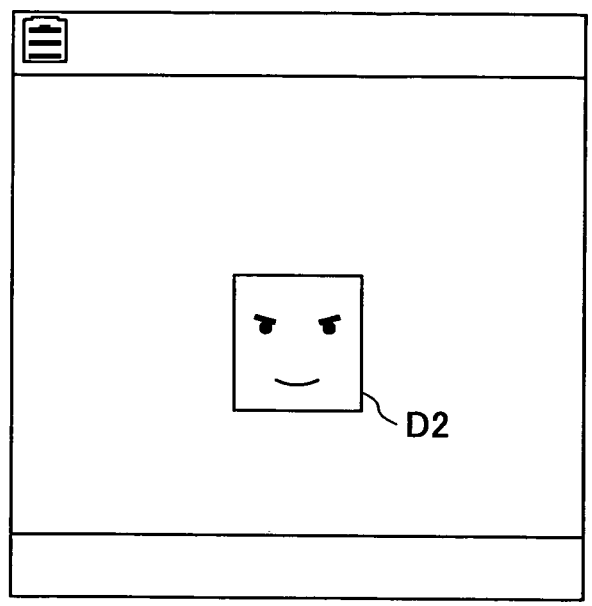
FIG. 19 is a diagram showing a default image data.
Figure 20:
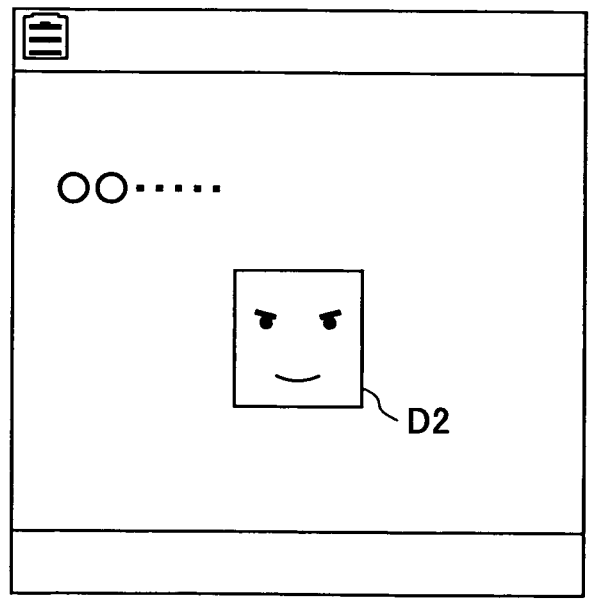
FIG. 20 is a diagram showing a standby screen in which the image data is replaced by the default image data.

In the case of the standby screen, the screen display process shown in FIG. 18 is started after an operation, such as turning ON the power of the portable telephone, has been made. In FIG. 18, a step S21 decides whether or not the privacy mode is turned ON, that is, whether or not the privacy mode has been set with respect to the portable telephone. If the decision result in the step S21 is YES, a step S22 switches the image data D1 within the standby screen shown in FIG. 13 to the preset default contents shown in FIG. 19, that is, to the default image data D2, before displaying the standby screen on the main display part 9. FIG. 19 is a diagram showing the default image data D2. As a result, a standby screen shown in FIG. 20 is displayed on the main display part 9, and the screen display process ends. FIG. 20 is a diagram showing the standby screen in which the image data D1 has been replaced by the default image data D2. The default image data D2 may be stored in advance in the storage part 4 depending on the operation of the key operation part 5.

On the other hand, if the decision result in the step S21 is NO, a step S23 displays the standby screen shown in FIG. 13, as it is, on the main display part 19, and the screen display process ends.

In the case of the call/receive screen, the screen display process shown in FIG. 18 is started using the calling or the call receiving operation of the portable telephone as a trigger. In this case, if the decision result in the step S21 is YES, the step S22 switches the image data D1 within the call/receive screen shown in FIG. 15 to the preset default contents shown in FIG. 19, that is, to the default image data D2, before displaying the call/receive screen on the main display part 9. As a result, a call/receive screen in which the image data D1 shown in FIG. 15 has been replaced by the default image data D2 is displayed on the main display part 9, and the screen display process ends. The illustration of the call/receive screen in which the image data D1 has been replaced by the default image data D2 will be omitted.

Similarly, in the case of the e-mail send/receive screen, the screen display process shown in FIG. 18 is started using the e-mail sending or the receiving operation of the portable telephone as a trigger. In this case, if the decision result in the step S21 is YES, the step S22 switches the image data D1 within the e-mail send/receive screen shown in FIG. 17 to the preset default contents shown in FIG. 19, that is, to the default image data D2, before displaying the call/receive screen on the main display part 9. As a result, an e-mail send/receive screen in which the image data D1 shown in FIG. 17 has been replaced by the default image data D2 is displayed on the main display part 9, and the screen display process ends. The illustration of the e-mail send/receive screen in which the image data D1 has been replaced by the default image data D2 will be omitted.

The image data D1 (that is, data and/or folder contents that are set by the secret setting) and/or the image data D2 (that is, default contents) may stored in advance in the storage part 4 depending on the operation of the key operation part 5 or, received as external contents from outside the portable telephone and stored in the storage part 4 or, picked up by the camera 11 and stored in the storage part 4.

The data pasted onto the standby screen, the call/receive screen or the e-mail send/receive screen are not limited to the image data, and may be audio data or a combination of image data and corresponding audio data. Similarly, the default data are also not limited to the image data, and may be audio data or a combination of image data and corresponding audio data. In addition, if the pasted data are dynamic image data, the default data may be still image data. Moreover, if the pasted data are the combination of the image data and corresponding audio data, the default data may consist solely of image data. In other words, the pasted data and the default data do not necessarily have to be the same kind of data. Furthermore, if the default data are image data, it is preferable that the image data are other than blank data which result in no display (blank or virtually no display), in order to prevent the user from erroneously judging that the portable telephone is out of order due to no (or virtually no) display being made.

In the embodiment described above, the screen displayed on the main display part 9 is switched during the privacy mode. However, the screen that is switched may of course be displayed on the sub display part 10 or, displayed on both the main display part 9 and the sub display part 10.

In addition, in the embodiment described above, the privacy mode is a single mode and is set by a single PIN. However, by providing a plurality of PINs or the like, it is of course possible to set a plurality of privacy modes having different security levels. In this case, depending on the state of the portable telephone, the privacy mode of the corresponding security level is turned ON (validated).

The secret setting in the embodiment only has 2 states, that is, the ON state and the OFF state. However, it is of course possible to provide 3 or more states for the secret setting, so that 3 or more secret levels may be set. In this case, depending on the state of the portable telephone, the access to and display of the data or folder having the corresponding secret level are prohibited.

Further, the present invention is not limited to these embodiments, but various variations and modifications may be made without departing from the scope of the present invention.

What is claimed is:

1. An electronic apparatus having a communicating function and a privacy mode that prohibits access to and display of data and/or folders with respect to which a secret setting has been made, comprising:
   a storage part configured to store first contents, and second contents of the data and/or the folders with respect to which the secret setting has been made;
   a display part configured to display a standby screen, a call/receive screen or an electronic mail send/receive screen; and
   a control part configured to switch contents of a screen to be displayed on the display part by displaying the first contents in place of the second contents during the privacy mode, if the second contents of the data and/or the folders with respect to which the secret setting has been made are set in the standby screen, the call/receive screen or the electronic mail send/receive screen,
   wherein the first contents and the second contents are mutually different data, and
   the first contents are other than blank data.

2. The electronic apparatus as claimed in claim 1, wherein the first contents are preset default contents.

3. The electronic apparatus as claimed in claim 1, further comprising:
   a key operation part configured to input information,
   wherein the first contents and/or the second contents are prestored in the storage part depending on an operation of the key operation part.

4. The electronic apparatus as claimed in claim 3, wherein the first contents and/or the second contents are received from outside the electronic apparatus.

5. The electronic apparatus as claimed in claim 3, further comprising:
   a camera,
   wherein the first contents and/or the second contents are image data picked up by the camera.

6. The electronic apparatus as claimed in claim 1, wherein the first contents and/or the second contents are received from outside the electronic apparatus.

7. The electronic apparatus as claimed in claim 1, wherein the first contents and the second contents include at least image data.

8. The electronic apparatus as claimed in claim 1, wherein the control part includes a part configured to set the data and/or the folder with respect to which the secret setting has been made, to the standby screen, the call/receive screen or the electronic mail send/receive screen.

9. The electronic apparatus as claimed in claim 1, wherein the first contents are still image data or dynamic image data, and the second contents are still image data or dynamic image data.

10. The electronic apparatus as claimed in claim 1, wherein the first contents are image data and corresponding audio data, and the second contents are image data and corresponding audio data.

* * * * *